United States Patent [19]
Nakamura et al.

[11] Patent Number: 5,918,155
[45] Date of Patent: Jun. 29, 1999

[54] SATELLITE COMMUNICATION SYSTEM AND METHOD THEREOF

[75] Inventors: Shigeki Nakamura, Tokyo; Noriaki Ishida, Yokosuka, both of Japan

[73] Assignee: Hitachi, Ltd., Tokyo, Japan

[21] Appl. No.: 08/602,886

[22] Filed: Feb. 16, 1996

[30] Foreign Application Priority Data

Mar. 13, 1995 [JP] Japan .................................. 7-053026

[51] Int. Cl.$^6$ ................................................. H04B 7/185
[52] U.S. Cl. ........................ 455/12.1; 455/426; 455/428; 370/316
[58] Field of Search .................................. 455/12.1, 426, 455/428, 427, 430, 448, 445, 447; 370/316, 320, 18, 19, 75, 76

[56] References Cited

U.S. PATENT DOCUMENTS

| 5,412,660 | 5/1995 | Chen et al. | 370/110.1 |
| 5,572,530 | 11/1996 | Chitre et al. | 370/110.1 |
| 5,592,481 | 1/1997 | Wiederman et al. | 370/316 |
| 5,628,050 | 5/1997 | McGraw et al. | 455/12.1 |
| 5,655,215 | 8/1997 | Diachina et al. | 455/426 |
| 5,659,878 | 8/1997 | Uchida et al. | 455/426 |

*Primary Examiner*—Anand S. Rao
*Attorney, Agent, or Firm*—Frohwitter

[57] ABSTRACT

A satellite communication system by which information of afflicted areas can be collected rapidly and accurately at the time of disaster such as an earthquake or the like, and which is easy to introduce. In the system, a center station accommodates a plurality of extensions of a private branch exchange. Portable terrestrial stations are made to one-to-one correspond to the extensions accommodated in the private branch exchange and the center station connects the extensions to the corresponding portable terrestrial stations. The respective frequency bands of a communication satellite to be used for the transmission from each of the portable terrestrial stations to the center station and for the transmission from the center station of each of the portable terrestrial stations corresponding to the one extension are stationarily secured. Each portable terrestrial station is small-sized so as to be portable by a person or by a motorcycle.

18 Claims, 6 Drawing Sheets

SATELLITE COMMUNICATION SYSTEM AND METHOD THEREOF

BACKGROUND OF THE INVENTION

1. Field of the Invention

The present invention relates to a satellite communication system for performing communication between terrestrial stations through a communication satellite, and particularly relates to a satellite communication system suitable for information collection of afflicted areas at the time of a disaster or the like.

2. Description of the Related Art

A telephone line network in which a satellite line is assigned in accordance with a call generated from a terrestrial station in a demand-on assign system has been known as a telephone line network using a satellite communication system for performing communication between very small terrestrial stations (Very Small Aperture Terminals: VSATS) through a communication satellite.

At the time of a disaster or the like, such as an earthquake or the like, it is very important to collect information of afflicted areas rapidly on taking effective means to meet the disaster.

However, at the time of a disaster or the like, such as an earthquake or the like, there is a case where a public telephone line network on the ground also suffers damages from extinction of communication lines or the like. There is also a case where telephone is apt to be out of order in a public telephone line network because of concentration of calls. It is therefore impossible to expect rapid collection of information of afflicted areas through telephone using such a public telephone line network.

On the other hand, in a telephone line network using satellite communication, the communication lines are wireless, and there is lower possibility that a disaster or the like disables the network from being used. In addition, because of using a satellite, it is possible to perform communication from a certain point with wider areas afflicted with the disaster.

That is, such a satellite communication system can be regarded as a system suitable for collecting information of afflicted area rapidly at the time of disaster. Even in a satellite communication system, however, if it is public network, it is inevitable that telephone is apt to be out of order because of concentration of calls. On the other hand, it makes the burden of cost, equipment and so on too heavy to provide terrestrial stations in various places or to build a satellite communication system which includes a call switching function for exclusive use for disaster. If the system does not include a call switching function, the system cannot be used flexibly at the time of disaster or the like. In addition, it can be considered that terrestrial stations provided in various places suffer damages so that they cannot be used at the time of disaster.

SUMMARY OF THE INVENTION

It is therefore an object of the present invention to solve the foregoing problems.

It is another object of the present invention to provide a satellite communication system by which information of afflicted areas can be collected rapidly and accurately at the time of disaster such as an earthquake or the like, and which is easy to introduce.

In order to attain the foregoing objects, the present invention provides a satellite communication system comprising a center station and a plurality of portable terrestrial stations so that the center station and the portable terrestrial stations can perform communication with each other through a communication satellite. The center station has means for accommodating a plurality of extensions of a private branch exchange, means for assigning the accommodated extensions to the portable terrestrial stations in one-to-one correspondence, and a connection portion for connecting a call from any one of the accommodated extensions to a portable terrestrial station corresponding to the one extension, and connecting a call from any one of the portable terrestrial stations to an extension corresponding to the one portable terrestrial station.

According to the satellite communication system of the present invention, a call from any one of the extensions of the private branch exchange accommodated in the center station is connected to a portable terrestrial station corresponding to the one extension, and a call from any one of the portable terrestrial stations is connected to an extension of the private branch exchange corresponding to the one portable terrestrial station.

Accordingly, the portable terrestrial stations can be used quite as if they are extension telephones of a private branch exchange. In addition, because the exchange function of an existing private branch exchange which has been laid is used as the call exchange function in this system, the burden of cost and equipment when this system is introduced can be made lower, so that the system can be introduced easily. In addition, it is possible to use this system not only from extension telephones connected to the extensions accommodated in the private branch exchange but also from a public telephone line network relayed through the private branch exchange. In the case of using the system from the extension telephones, it is possible to ensure communication within the system independently of disaster or crowdedness of the public telephone line network, and in the case of using the system from the public telephone line network, it is possible to collect information from the portable terrestrial stations at desired places.

DETAILED DESCRIPTION OF THE PREFERRED EMBODIMENT

An embodiment of a satellite communication system according to the present invention will be described below with reference to the drawings.

Figure 1:
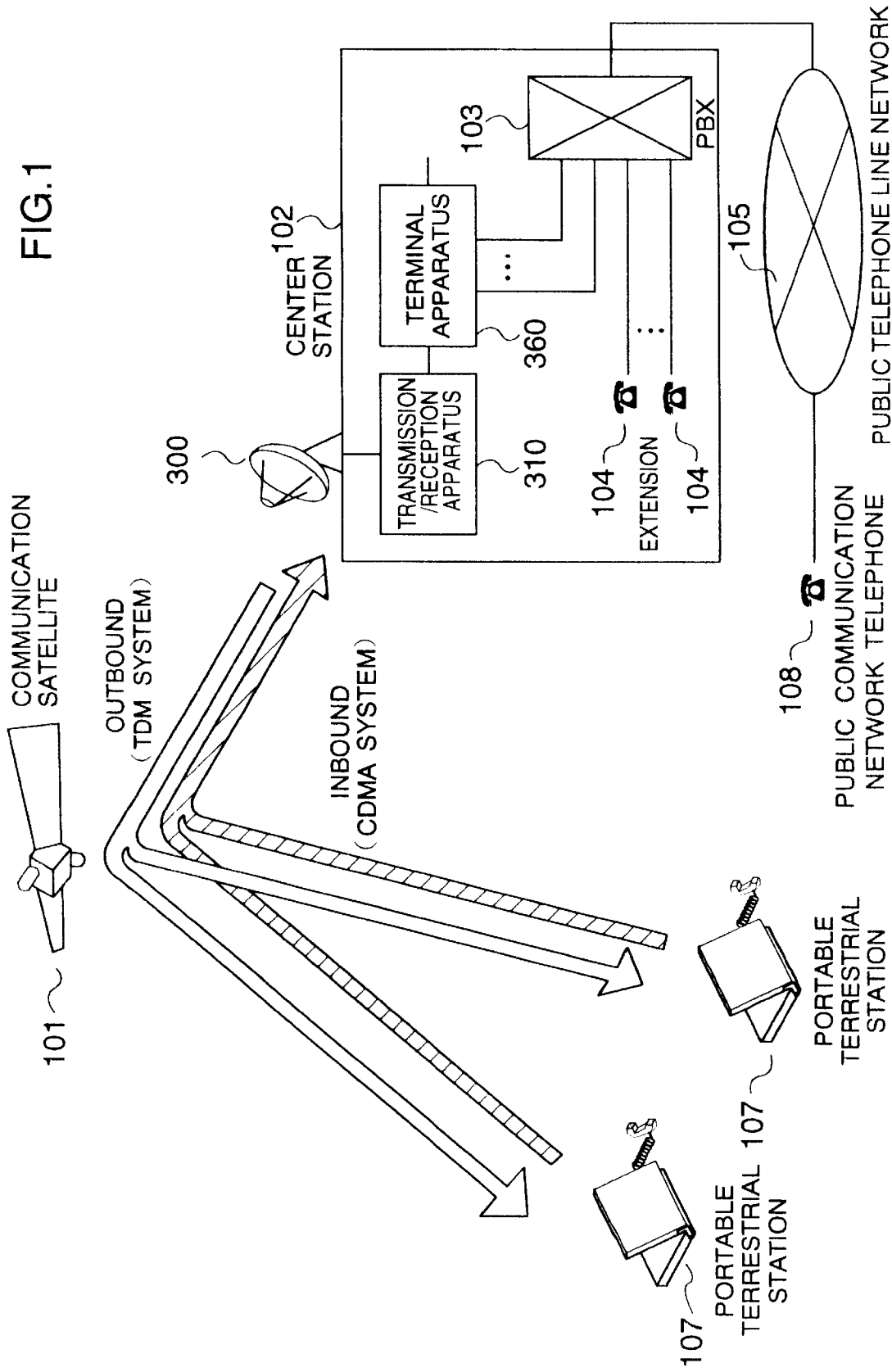
FIG. 1 is a diagram illustrating a configuration of a satellite communication system.

FIG. 1 shows a configuration of a satellite communication system according to an embodiment.

In the drawing, the reference numeral 101 represents a communication satellite, and 102 a center station, which includes a transmission/reception apparatus 310 and a terminal apparatus 360. The reference numeral 107 represents a portable terrestrial station; 104, extension telephones; 105, a public telephone line network; 103, a PBX connected to the public telephone line network 105; and 108, a public communication network telephone connected to the public telephone line network 105. The PBX 103 is a private branch exchange having a plurality of extensions provided on the premises of an office or the like, and accommodating a plurality of extension telephones 104 on the premises in the extensions.

In such a configuration, the center station 102 is equipped with the plurality of extensions of the PBX 103. The respective portable terrestrial stations 107 are put in one-to-one correspondence to the extensions equipped in the PBX 103, and the center station 102 connects the respective extensions to the portable terrestrial stations 107 corresponding to the extensions. Between the center station 102 and the portable terrestrial stations 107, signals are transmitted from the center station 102 to the respective portable terrestrial stations 107 in an TDM (Time-Division Multiplex) system, while signals are transmitted from the respective portable terrestrial stations 107 to the center station 102 in a CDMA (Code-Division Multiple Access) system using a spectrum diffusion system.

A frequency band of the communication satellite 101 used for transmission from the respective portable terrestrial stations 107 to the center station 102, and a frequency band of the communication satellite 101 used for transmission from the center station 102 to the respective portable terrestrial stations 107 are ensured stationarily. The portable terrestrial stations 107 are miniaturized to be carried by hand or by motorcycle.

With such a configuration, the telephones 108 connected to the public communication network 105 and the extension telephones 104 connected directly to the PBX 103 can communicate with the portable terrestrial stations 107 taken to afflicted areas, in the same manner as communication with the extension telephones 104 connected to the PBX 103. It is therefore possible to collect information of the afflicted areas rapidly through the telephones connected to the public communication network 105 or the extension telephones 104. In addition, since the exchange function of an existing PBX which has been laid is used as the exchange function of this system, the introduction of the system is easier than the case where an independent system for exclusive use for disaster. Further, it is possible to ensure the communication between the extension telephones 104 connected directly to the extensions of the PBX 103 and the portable terrestrial stations 107 regardless of the state of the disaster on the public communication network, etc. In addition, since the extension telephones 104 communicate with the portable terrestrial stations 107, the telephones are not necessary for exclusive use but may be for general use.

A transmission format used for transmission by the center station 102 and a transmission format used for transmission by the respective portable terrestrial stations 107 will be described.

First, a transmission format used for transmission by the center station 102 will be described.

Figure 2:
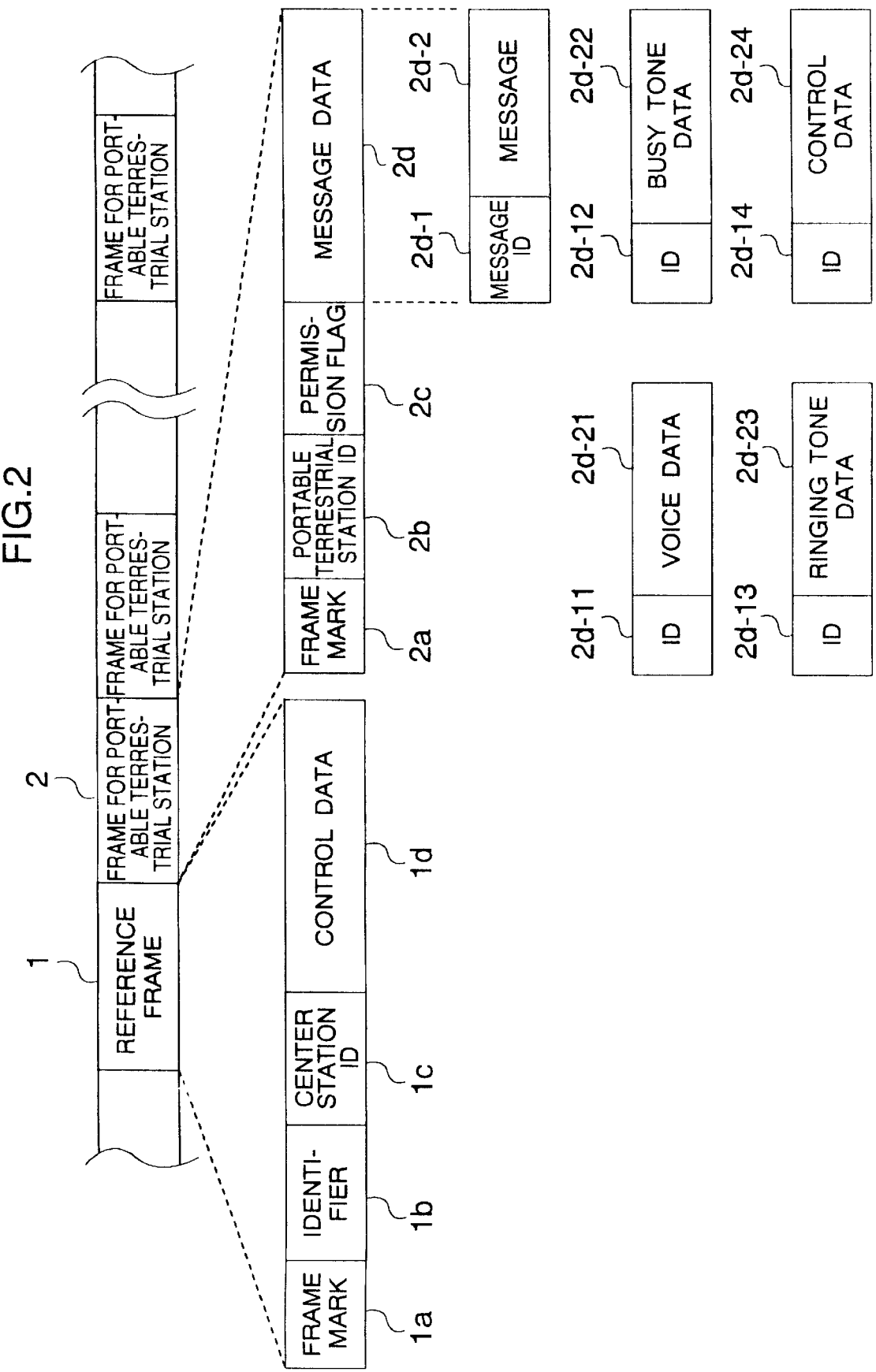
FIG. 2 is a diagram illustrating a transmission format of a center station.

FIG. 2 shows a transmission format used for transmission by the center station 102.

As illustrated, the center station 102 transmits, in time-division multiplex, one reference frame 1 and portable terrestrial station frames 2 one for one portable terrestrial station 107.

The reference frame 1 is a frame to be received by all the portable terrestrial stations 107, and includes a frame mark 1a, an identifier 1b, a center station ID 1c, and a control data 1d. The frame mark 1a is a pattern data for recognizing the reference frame in the portable terrestrial stations 107. The identifier 1b shows that the frame is a reference frame, and the center station ID 1c shows the ID of the center station transmitting the reference frame. The control data id shows the content of common control performed upon all the portable terrestrial stations 107.

Next, the portable terrestrial station frame 2 is a frame to be received by an individual portable terrestrial station 107, and is constituted by a frame mark 2a, a portable terrestrial station ID 2b, a permission flag 2c, and a message data 2d. The frame mark 2a is a pattern data for recognizing the portable terrestrial station frame in the portable terrestrial stations 107. The portable terrestrial station ID 2b is information for identifying a portable terrestrial station 107 which should receive the portable terrestrial station frame. The permission flag 2c is a flag which indicates whether transmission to the portable terrestrial station 107 identified by the portable terrestrial station ID 2b is permitted or not. Next, the message data 2d is constituted by a message 2d-2 and a message ID 2d-1 showing the type of the message. In this embodiment, an voice data 2d-21, a control data 2d-24, a ringing tone data 2d-23 and a busy tone data 2d-22 are sent as the message transmitted from the center station 102 to the portable terrestrial station 107. Unique values are added to the respective data as message IDs (2d-11, 2d-12, 2d-13 and 2d-14).

Next, the transmission format used for transmission by the respective portable terrestrial stations 107 will be described.

Figure 3:
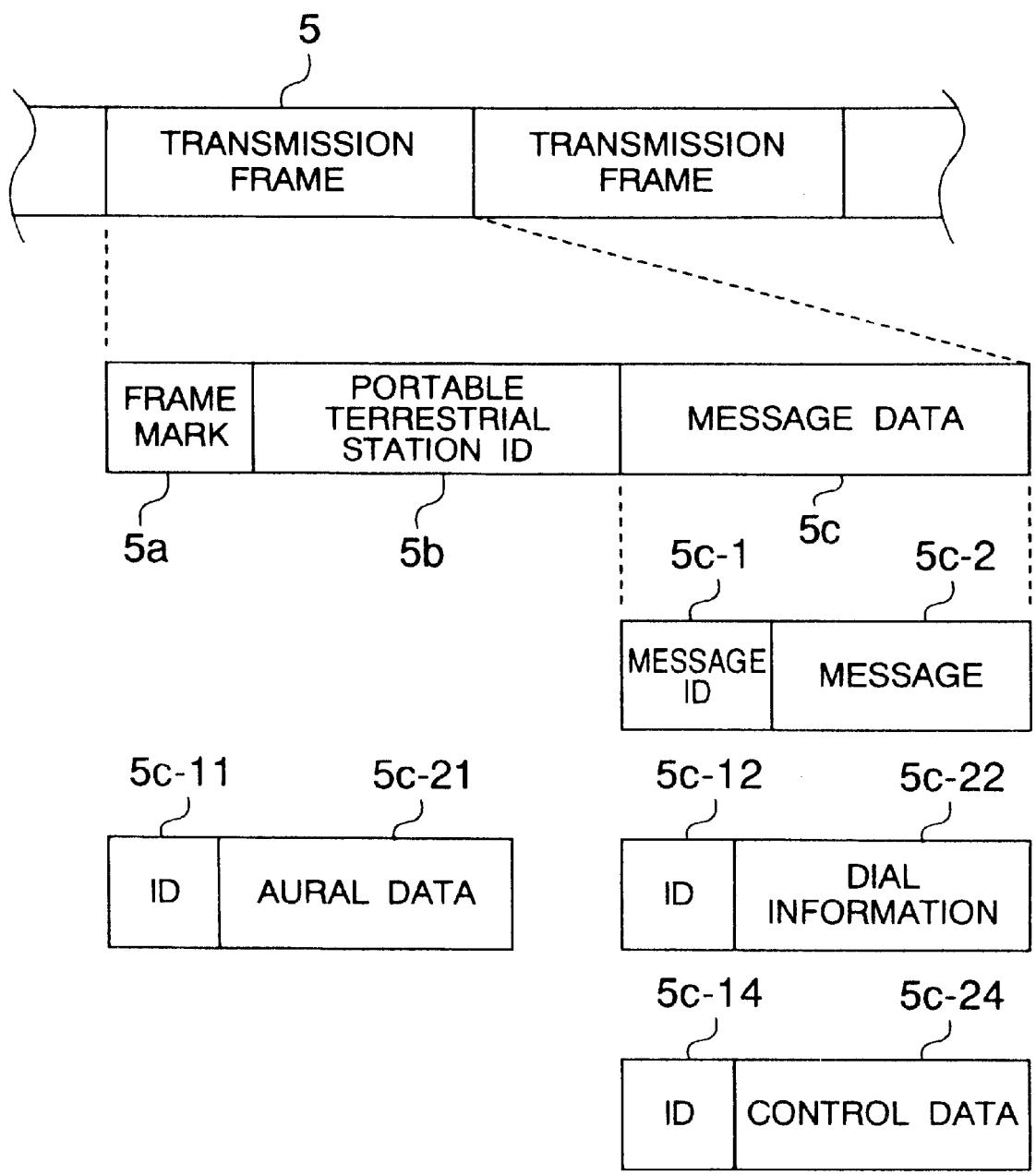
FIG. 3 is a diagram illustrating a transmission format of a portable terrestrial station.

FIG. 3 shows the transmission format used for transmission by the respective portable terrestrial stations 107.

As illustrated, each of the portable terrestrial stations 107 transmits a transmission frame 5 repeatedly. The transmission frame transmitted by the respective portable terrestrial stations 107 is transmitted in a CDMA system by spectrum diffusion as mentioned above.

The transmission frame 5 is constituted by a frame mark 5a, a portable terrestrial station ID 5b, and a message data 5c. The frame mark 5a is a pattern data for recognizing the transmission frame in the center station 102. The portable terrestrial station ID 5b is information for identifying a portable terrestrial station 107 transmitting the transmission frame. Next, the message data 5c is constituted by a message 5c-2 and a message ID 5c-1 showing the type of the message. In this embodiment, an audio data 5c-21, a dial information 5c-22, and a control data 5c-24 are sent as the message transmitted from the portable terrestrial station 107 to the center station 102. Unique values are added to the respective data as message IDs (5c-11, 5c-12, and 5c-14).

Next, the portable terrestrial station 107 will be described in detail.

Figure 4:
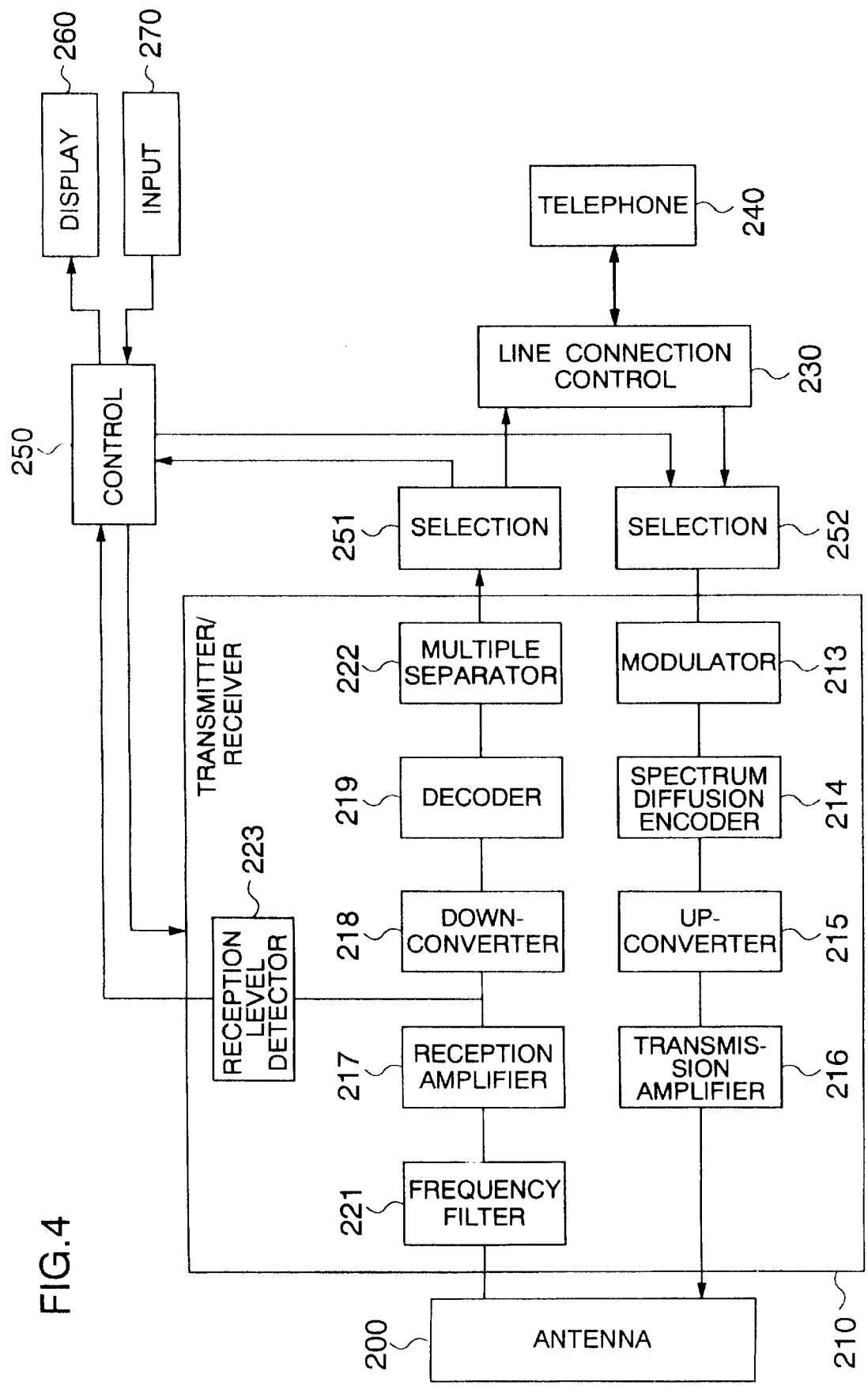
FIG. 4 is a block diagram illustrating a configuration of a portable terrestrial station.

FIG. 4 shows the configuration of a transmission/reception system of the portable terrestrial station 107.

As illustrated, the portable terrestrial station 107 has an antenna 200, a transmitter-receiver 210, a line connection control portion 230, a telephone portion 240, a control portion 250, selection portion 251 and 252, an display portion 260, and an input portion 270.

The transmitter-receiver 210 has a modulator 213, spectrum diffusion encoder 214, an up-converter 215, a transmission amplifier 216, a reception amplifier 217, a down-converter 218, a decoder 219, a multiple separator 222, a reception level detector 223, and a frequency filter 221. The telephone portion 240 has a transmission/receiver, a dial key and so on, which are, however, not shown.

With such a configuration, signals from the center station 102 are received in the portable terrestrial stations 107 in such a manner as follows.

That is, the components not lower than 14 GHz of a Ku-band (14 GHz) signal transmitted from the center station 102 and received by the antenna 200 are attenuated by the frequency filter 221. Thereafter, the signal is amplified by the reception amplifier 217, and converted into a signal of the 1 GHz frequency by the down-converter 218. The signal converted into the 1 GHz frequency is decoded by the decoder 219, and supplied to the multiple separator 222.

The multiple separator 222 extracts, from the received signal, the above-mentioned reference frame 1 and the portable terrestrial station frame 2 having its own portable terrestrial station ID 2b, and sends the frames 1 and 2 to the selection portion 251. The selection portion 251 performs an error correcting process upon the sent frames 1 and 2. Then, the selection portion 251 sends the contents 1a to 1d of the reference frame 1, the permission flag 2c of the portable terrestrial station frame 2, and the control data 2d-24 of the message data 2d of the portable terrestrial station frame 2 to the control portion 250, while the selection portion 251 sends the audio data 2d-21 of the message data 2d, the calling-sound data 2d-23 and the busy-sound data 2d-22 of the portable terrestrial station frame 2 to the line connection control portion 230. The kind of data is identified by its respective message ID.

The control portion 250 controls the operations of the respective portions, such as the display operation on the display 260, in accordance with the contents of the received reference frame center station ID 1c or control data 1d, and the permission flag 2c and the control data 2d-24 of the portable terrestrial station frame 2. For example, when the permission flag 2c shows that the transmission is not permitted, the control portion 250 prevents the transmitter-receiver 210 from transmitting. In addition, the control portion 250 makes the display 260 display the received center station ID.

On the other hand, the line connection control portion 230 controls the telephone portion 240 in accordance with the contents of the data received from the selection portion 251. This control on the telephone portion 240 includes the control on the output of a calling sound based on the calling-sound data 2d-23, the transmission of a busy sound, based on the busy-sound data 2d-22, to the handset provided in the telephone portion 240, the decoding of the audio data 2d-21 into an audio signal, and the transmission of the decoded audio signal to the handset provided in the telephone portion 240.

The signal amplified by the reception amplifier 217 is also sent to the reception level detector 223. The reception level detector 223 detects the field intensity of the received signal, and transmits the level of the detected field intensity level to the control portion 250. In response to the input from the input portion 270, the control portion 250 makes the display 260 display the level transmitted from the reception level detector 223.

On the other hand, the transmission from the portable terrestrial stations 107 to the center station is performed as follows.

That is, the telephone portion 240 transmits, to the line connection control portion 230, a signal showing the audio signal supplied into a handset, a signal showing the on-hook/off-hook state of the handset, and a signal showing the content supplied from the dial key. The line connection control portion 230 adds the message ID 5c-i (5c-11 to 5c-24) to these signals, makes up the audio data 5c-21, the dial information 5c-22 and the message data 5c-2, and sends this data to the selection portion 252. On the other hand, the control portion 250 transmits, to the selection portion 252, the message data 5c in which the message ID 5c-14 is added to the control data 5c-24 to be transmitted to the center station 102.

The selection portion 252 suitably adds an error-correction code and so on to the respective received message data if necessary. Then, the selection portion 252 adds its own portable terrestrial station ID 5b and the frame mark 5a to the message data to thereby form the transmission frame 5 described above, and sends the message data to the modulator 213 sequentially.

The modulator 213 modulates the received transmission frame to obtain a signal of the 1 GHz frequency. This modulated signal is spectrum-diffusion-encoded by the spectrum diffusion encoder 214 so that the spectrum thereof is diffused. The spectrum-diffusion-encoded signal is thereafter converted into a Ku-band signal such as a signal of the 14 GHz frequency by the up-converter 215, amplified by the transmission amplifier 216, and sent to the antenna 200. The antenna 200 transmits this amplified signal to the communication satellite.

Next, the configuration of the center station 102 will be described.

Figure 5:
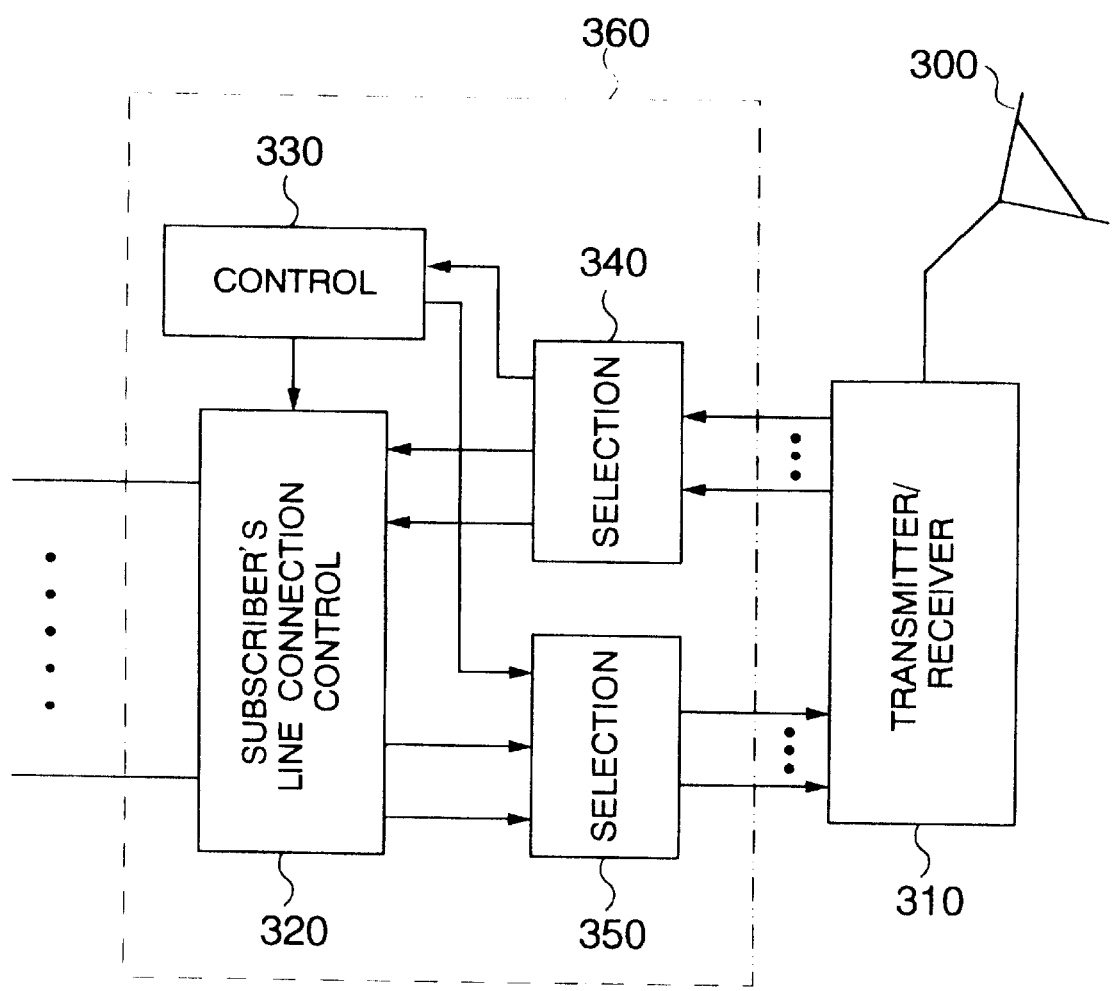
FIG. 5 is a block diagram illustrating a configuration of a center station.

FIG. 5 shows the configuration of the center station 102.

The center station 102 is constituted by an antenna 300, a transmitter-receiver 310, a subscriber's line connection control portion 320, a control portion 330, and selection portions 340 and 350 as illustrated.

Through the antenna 300, the transmitter-receiver 310 receives a signal which is transmitted, by use of the Ku-band, from any of the respective portable terrestrial stations 107 through the communication satellite. This signal is decoded so as to be separated into the transmission frames 5 of every portable terrestrial station 107, and then sent to the selection portion 340. The selection portion 340 performs an error correction process upon the separated transmission frame 5 of every portable terrestrial station 107, and at the same time sends the message data 5c and the portable terrestrial station ID 5b of the control data 5c-24 included in the transmission frame 5 to the control portion 330. The other message data 5c-21 to 5c-22 are sent to the subscriber's line connection control portion 320 through a line corresponding to the extension corresponding to the portable terrestrial station ID 5b included in the transmission frame 5, which line is selected on the basis of the portable terrestrial station ID 5b included in the transmission frame 5 and on the basis of the correspondence between portable terrestrial station IDs and extensions established by the control portion 330 in advance. On the basis of the contents of the received message data 5c, the extension assigned to each portable terrestrial station 107, that is, the extension corresponding to the line through which the message data has been received is controlled by the subscriber's line connection control portion 320. This control on the extension includes the control on the DC loop control of the extension corresponding to the control data 5c-24 received as the message data from the corresponding portable terrestrial station 107, the control on the output, from the extension, of a DTMF sound corresponding to dial key information, and the control on the decoding of audio data and the output thereof to the extension.

On the contrary, the subscriber's line connection control portion 320 detects the state of very extension. That is, for example, the subscriber's line connection control portion 320 detects the existence of a calling-sound signal or the existence of a busy sound on the extension. In accordance with the detected state, the subscriber's line connection control portion 320 generates the calling-sound data 2d-23 or the busy-sound data 2d-22, and sends the message data 2d, in which the message IDs 2d-13 and 2d-12 are added to these generated data, to the selection portion 350 through a line corresponding to the extension. In addition, the subscriber's line connection control portion 320 encodes the audio signal received from the extension, and sends, to the selection portion 350, the message data 2d in which the message ID 2d-11 is added to the encoded audio data 2d-21.

The control portion 330 also sends, to the selection portion 350, the message data 2d in which message IDs are added to respective messages to be sent to the respective portable terrestrial stations 107 individually, together with the portable terrestrial station IDs 2b of the respective portable terrestrial stations 107 which are the destinations of the message data. In addition, the control portion 330 generates the above-mentioned reference frame, and sends it to the selection portion 350. The selection portion 350 receives the message data 2d (2d-24) proper to the respective portable terrestrial stations 107 from the control portion 330, in addition to the message data 2d (2d-21 to 2d-23) received from the subscriber's line connection control portion 320 correspondingly to the respective extensions. As for the message data received from the subscriber's line connection control portion 320, the portable terrestrial station ID of the portable terrestrial station 107 which is the destination of transmission is recognized on the basis of the correspondence between extensions and portable terrestrial station IDs established by the control portion 330 in advance. On the other hand, as for the message data proper to the respective portable terrestrial stations from the control portion 330, the portable terrestrial station ID of the portable terrestrial station 107 which is the destination of transmission is recognized on the basis of the portable terrestrial station ID transmitted together therewith. An error correction code is, if necessary, added to these message data for every portable terrestrial station 107 which is the destination of transmission, and the recognized portable terrestrial station ID 2b is also added thereto to thereby form the portable terrestrial station frame 2 for every portable terrestrial stations 107. The portable terrestrial frames 2 for the respective portable terrestrial stations 107 and the reference frame 1 received from the control portion 330 are sent, in time-division-multiplex, to the transmitter-receiver 310. The transmitter-receiver 310 modulates the received frame signal, and sends the modulated signal to the communication satellite. Then, the control portion 330 forms the above-mentioned reference frame and the control data in accordance with the operation which is performed by an operator through the input portion 360.

With the above-mentioned configuration, the center station 102 can use the portable terrestrial stations 107 in the same manner as usual extension telephones, upon not only audio data but also information for controlling calls of extensions, through the connection between the PBX 103 and the portable terrestrial stations 107. In the above embodiment, a PBX having the most general analog telephone line interface as an extension interface is assumed as the PBX 103, and calling-sound data, busy-sound data, information of on-hook/off-hook or dial information is transmitted and received between the center station 102 and the portable terrestrial stations 107 as the information for controlling the calling so as to control the extensions and the portable terrestrial stations 107 on the basis thereof. However, the information transmitted and received for call control or the control based thereon is changed in accordance with the extension interface of the PBX 103. For example, if the extension interface of the PBX 103 is a basic interface of ISDN, call control information of the D-channel or synchronizing information of the layer 1 level may be used as the information transmitted and received for call control.

In addition, with the above-mentioned configuration, the center station 102 and the respective portable terrestrial stations 107 can exchange control data with each other.

Here, it is not always necessary to assign the extensions to the respective portable terrestrial stations 107 in advance but the configuration may be made such that, at the start of the system, or the like, the control portion 250 of one of the actuated portable terrestrial stations 107 transmits a connection request as control data, and the control portion 330 of the center station 102 receiving this request informs the selection portions 340 and 350 of the correspondence between extensions and portable terrestrial station IDs so that a corresponding extension is assigned to the portable terrestrial station transmitting the connection request. In this case, thereafter, a value showing the permission of transmission is given to the above-mentioned permission flag, and the permission flag is transmitted to the portable terrestrial station transmitting the connection request so as to allow the portable terrestrial station 107 to make a call.

Figure 6:
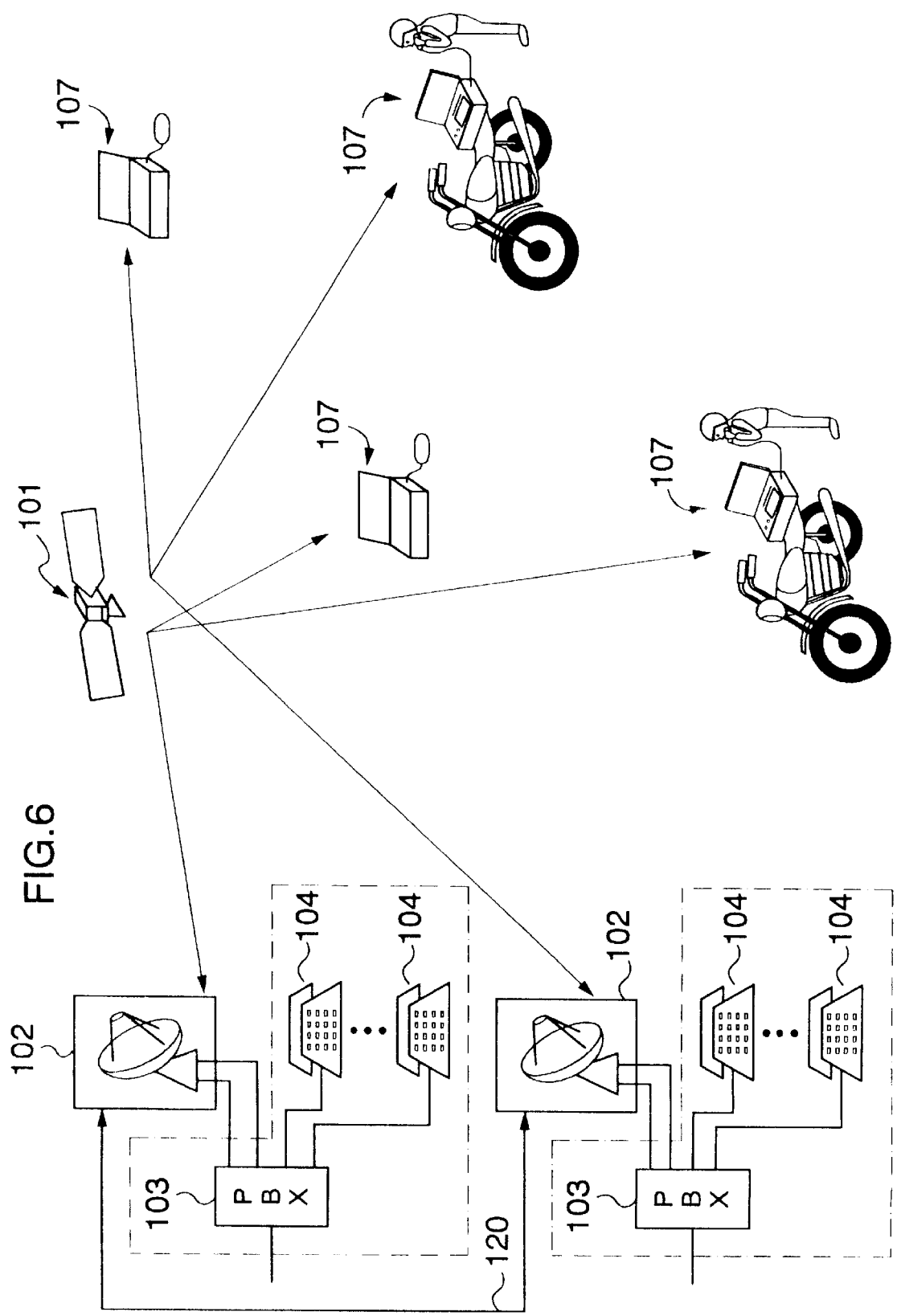
FIG. 6 is a diagram illustrating another configuration of a satellite communication system.

In addition, since the center station 102 can make remote control of the respective portable terrestrial stations 107 by use of the control data and the permission flag, a desired one of the portable terrestrial stations 107 can be selected as the portable terrestrial station 107 which performs communication. Therefore, for example, if a plurality of center stations 102 are provided as shown in FIG. 6, the respective center stations 102 can communicate with desired ones of a plurality of portable terrestrial stations 107. In this case, however, it is necessary that the portable terrestrial stations 107 with which a specific one of the center stations 102 communicates is designated by the specific center station 102 through a specific communication line 120. In this case, the control portions 330 of the respective center stations 102 inform their own selection portions 340 and 350 of the correspondence between their extensions and the portable terrestrial station IDs, so that extensions are assigned to the portable terrestrial stations dynamically. In such a manner, even when the center station with which the portable terrestrial stations 107 communicate is not fixed, each of the portable terrestrial stations 107 displays the received center station ID on the display 260 as mentioned above, so that a user can recognize the center station to which the user is communicating.

What is claimed is:

1. A satellite communication system comprising a center station and a plurality of portable terrestrial stations so that said center station and said plurality of portable terrestrial stations can perform communication with each other through a communication satellite, said center station including:

antenna for receiving a portable terrestrial station transmission signal being transmitted from any of said portable terrestrial stations through said communication satellite and being constituted by a transmission frame containing message data and a portable terrestrial station ID, and for transmitting a center station transmission signal for said respective portable terrestrial stations to said communication satellite;

a transmitter-receiver including a reception portion for demodulating/decoding a transmission signal constituted by a transmission frame from each of said portable terrestrial stations and received by said antenna, and a transmission portion for encoding/modulating a signal transmitted from said center station and constituted by a reference frame and frames for said plurality of portable terrestrial stations, and for transmitting the modulated signal as a transmission signal of said center station to said communication satellite through said antenna;

a selection portion including a reception system portion and a transmission system portion, said reception system portion being adapted to selectively send control data of the message data and the portable terrestrial station ID of the transmission frame to a controller portion, to selectively send data including aural data other than the control data of said message data to a subscriber's line connection control portion, and to select a line of an extension corresponding to the portable terrestrial station ID of said transmission frame in response to the portable terrestrial station ID of said transmission frame and correspondence between portable terrestrial station IDs and extensions established by said controller portion, said transmission system portion being designed so that said transmission system portion recognizes a predetermined one of said portable terrestrial stations, that is, a destination portable terrestrial station, in response to the extension set by said controller portion and the portable terrestrial station when transmission message data for portable terrestrial stations from said subscriber's line connection control portion is to be sent to said destination portable terrestrial station; forms a portable terrestrial station frame for the destination portable terrestrial station containing a portable terrestrial station ID of the recognized destination portable terrestrial station and said message data; and sends the thus formed frame and the reference frame formed by said controller portion in time-division-multiplex to said transmitter-receiver; and said subscriber's line connection control portion including a reception system having an accommodation portion accommodating extensions of a private branch exchange and a controller portion for controlling said extensions assigned to said respective portable terrestrial stations in accordance with the contents of the reception message data, and a transmission system for detecting the state of every extension, for forming information data to control a call in accordance with the detected state and for sending message data obtained by adding a message ID to said information data to said selection portion through a line corresponding to said extension;

each of said portable terrestrial stations including:

a transmitter-receiver having a reception antenna for receiving a transmission signal from said center station; a reception system portion for demodulating and decoding the signal received by said reception antenna and for separating the reference frame and the frame for the portable terrestrial station from each other; a transmission system portion for modulating the transmission frame from a second selection portion, for encoding the modulated signal to obtain a spectrum diffusion coded signal, and for supplying the coded signal to a transmission antenna; and a transmission antenna for transmitting said coded signal;

a first selection portion for transmitting the contents of said reference frame, and the permission flag and information data for controlling a call of the message data for the portable terrestrial station, a line connection control portion;

a second selection portion for generating the transmission frame containing the message data and its own portable terrestrial station ID and for supplying the generated transmission frame to the transmission system portion of said transmitter-receiver;

a controller portion for transmitting message data of the transmission frame in which a message ID is added to control data of the message data to said second selection portion, when said transmission frame is to be sent to said center station; and said line connection control portion including: a reception system portion having a controller portion for controlling a telephone portion in accordance with the contents of the message data from said first selection portion; and a transmission system portion for generating information data for controlling a call from said telephone portion and for transmitting the information data to said second selection portion.

2. A satellite communication system according to claim 1, wherein said transmitter-receiver of said portable terrestrial station further includes a reception level detection portion for detecting, in the portable terrestrial station, a level of a frame mark portion in said reference frame, for recognizing the frame for the portable terrestrial station, and wherein said controller portion makes indication on a display unit in accordance with the contents of the reference frame center station ID from said center station, the control data of said message data and the contents of the permission flag of the frame for the portable terrestrial station and controls said transmitter-receiver and said second selection portion to make them unable to perform transmission when said permission flag indicates rejection of transmission.

3. A satellite communication system according to claim 1, wherein said center station transmits its own center station identification information through said communication satellite to the respective portable terrestrial stations to which said extensions are assigned; and wherein said portable terrestrial station further includes a display unit for displaying information for identifying the center station indicated by the center station identification information when said portable terrestrial station receives said center station identification information from said communication satellite.

4. A satellite communication system according to claim 1, wherein said information data for call controlling include a call sound, a busy sound, on-hook/off-hook information and dial information.

5. A satellite communication system comprising a center station and a plurality of portable terrestrial stations so that said center station and said plurality of portable terrestrial stations can perform communication with each other through a communication satellite, said center station including:

an antenna for receiving a portable terrestrial station transmission signal being transmitted from any of said portable terrestrial stations through said communication satellite and being constituted by a transmission frame containing message data and a portable terrestrial station ID, and for transmitting a center station transmission signal for said respective portable terrestrial stations to said communication satellite;

a transmitter-receiver including a reception portion for demodulating/decoding a transmission signal constituted by a transmission frame from each of said portable terrestrial stations and received by said antenna, and a transmission portion for encoding/modulating a signal transmitted from said center station and constituted by a reference frame and frames for said plurality of portable terrestrial stations, and for transmitting the modulated signal as said center station transmission signal to said communication satellite through said antenna;

a selection portion including a reception system portion and a transmission system portion, said reception system portion being adapted to selectively send control data of the message data and the portable terrestrial station ID of the transmission frame to a controller portion, to selectively send data other than the control data of said message data to a subscriber's line connection control portion, and to select a line of an extension corresponding to the portable terrestrial station ID of said transmission frame in response to the portable terrestrial station ID of said transmission frame and correspondence between portable terrestrial station IDs and extensions established by said controller portion, said transmission system portion being designed so that said transmission system portion recognizes a predetermined one of said portable terrestrial stations, that is, a destination portable terrestrial station, on the basis of the extension set by said controller portion and the portable terrestrial station when transmission message data for portable terrestrial stations from said subscriber's line connection control portion is to be sent to said destination portable terrestrial station; forms a portable terrestrial station frame for the destination portable terrestrial station containing a portable terrestrial station ID of the recognized destination portable terrestrial station and said message data; and sends the thus formed frame and the reference frame formed by said controller portion in time-division-multiplex to said transmitter-receiver; and said subscriber's line connection control portion including a reception system having an accommodation portion accommodating extensions of a private branch exchange and a controller portion for controlling said extensions assigned to said respective portable terrestrial stations in accordance with the contents of the reception message data, and a transmission system for detecting the state of every extension, for forming information data to control a call in accordance with the detected state and for sending message data obtained by adding a message ID to said information data to said selection portion through a line corresponding to said extension.

6. A satellite communication system comprising a center station and a plurality of portable terrestrial stations so that said center station and said plurality of portable terrestrial stations can perform communication with each other through a communication satellite, each of said portable terrestrial stations including:

a transmitter-receiver having: a reception antenna for receiving a transmission signal from said center station; a reception system portion for demodulating and decoding the signal received by said reception antenna and for separating the reference frame and the frame for the portable terrestrial station from each other; a transmission system portion for modulating the transmission frame from a second selection portion, for encoding the modulated signal to obtain a spectrum diffusion coded signal, and for supplying the coded signal to a transmission antenna; and a transmission antenna for transmitting said coded signal;

a first selection portion for transmitting the contents of said reference frame, and the permission flag and information data for controlling a call of the message data for the portable terrestrial station, a line connection control portion;

a second selection portion for generating the transmission frame containing the message data and its own portable terrestrial station ID and for supplying the generated transmission frame to the transmission system portion of said transmitter-receiver;

a controller portion for transmitting message data of the transmission frame in which a message ID is added to control data of the message data to said second selection portion, when said transmission frame is to be sent to said center station; and said line connection control portion including a reception system portion having a controller portion for controlling a telephone portion in accordance with the contents of the message data from said first selection portion; and a transmission system portion for generating information data for controlling a call from said telephone portion and for transmitting the information data to said second selection portion.

7. A satellite communication system according to claim 1, wherein said transmitter-receiver of said portable terrestrial station further includes a reception level detection portion for detecting, in the portable terrestrial station, a level of a frame mark portion in said reference frame, for recognizing the frame for the portable terrestrial station, and wherein said controller portion makes indication on a display unit in accordance with the contents of the reference frame center station ID from said center station, the control data of said message data and the contents of the permission flag of the frame for the portable terrestrial station and controls said transmitter-receiver and said second selection portion to make them unable to perform transmission when said permission flag indicates rejection of transmission.

8. A satellite communication system according to claim 6, wherein said center station transmits its own center station identification information through said communication satellite to the respective portable terrestrial stations to which said extensions are assigned; and wherein said portable terrestrial station further includes a display unit for displaying information for identifying the center station indicated by the center station identification information when said portable terrestrial station receives said center station identification information from said communication satellite.

9. A satellite communication system according to claim 6, wherein said information data for call controlling include a call sound, a busy sound, on-hook/off-hook information and dial information.

10. A satellite communication method comprising a center station and a plurality of portable terrestrial stations so that said center station and said plurality of portable terrestrial stations can perform communication with each other through a communication satellite, said center station including:

a step for receiving a portable terrestrial station transmission signal being transmitted from any of said portable terrestrial stations through said communication satellite and being constituted by a transmission frame containing message data and a portable terrestrial station ID;

a step for transmitting a center station transmission signal for said respective portable terrestrial stations to said communication satellite;

a step for demodulating/decoding a transmission signal constituted by a transmission frame from each of said portable terrestrial stations and received by a antenna;

a step for encoding/modulating a signal transmitted from said center station and constituted by a reference frame and frames for said plurality of portable terrestrial stations, and for transmitting the modulated signal as a transmission signal of said center station to said communication satellite through said antenna;

a step for selectively sending control data of the message data and the portable terrestrial station ID of the transmission frame to a controller portion, and for selectively sending data including aural data other than the control data of said message data to a subscriber's line connection control portion, and for selecting a line of an extension corresponding to the portable terrestrial station ID of said transmission frame in response to the portable terrestrial station ID of said transmission frame and correspondence between portable terrestrial station IDs and extensions established by said controller portion;

a step for recognizing a predetermined one of said portable terrestrial stations, that is, a destination portable terrestrial station, on the basis of the extension set by said controller portion and the portable terrestrial station when transmission message data for portable terrestrial stations from said subscriber's line connection control portion is to be sent to said destination portable terrestrial station, and for forming a portable terrestrial station frame for the destination portable terrestrial station containing a portable terrestrial station ID of the recognized destination portable terrestrial station and said message data, and for sending the thus formed frame and the reference frame formed by said controller portion in time-division-multiplex to a transmitter-receiver;

a step for accommodating extensions of a private branch exchange;

a step for controlling said extensions assigned to said respective portable terrestrial stations in accordance with the contents of the reception message data; and a step for detecting the state of every extension, for forming information data to control a call in accordance with the detected state, and for sending message data obtained by adding a message ID to said information data to said selection portion through a line corresponding to said extension;

each of said portable terrestrial stations including a step for receiving a transmission signal from said center station;

a step for demodulating and decoding the signal received by said reception antenna and for separating the reference frame and the frame for the portable terrestrial station from each other;

a step for modulating the transmission frame from a second selection portion, for encoding the modulated signal to obtain a spectrum diffusion coded signal, and for supplying the coded signal to a transmission antenna;

a step for transmitting said coded signal;

a step for transmitting the contents of said reference frame, and the permission flag and information data for controlling a call of the message data for the portable terrestrial station, a line connection control portion;

a step for generating the transmission frame containing the message data and its own portable terrestrial station ID and for supplying the generated transmission frame to the transmission system portion of said transmitter-receiver;

a step for transmitting message data of the transmission frame in which a message ID is added to control data of the message data to a supply portion, when said transmission frame is to be sent to said center station; and a step for controlling a telephone portion in accordance with the contents of the message data;

a step for generating information data for controlling a call from said telephone portion and for transmitting the information data to said supply portion.

11. A satellite communication method according to claim 10, wherein said portable terrestrial station includes a step for detecting, in the portable terrestrial station, a level of a frame mark portion in said reference frame, for recognizing the frame for the portable terrestrial station, and said controlling step includes a step which makes indication on a display unit in accordance with the contents of the reference frame center station ID from said center station, the control data of said message data and the contents of the permission flag of the frame for the portable terrestrial station and controls said portable terrestrial station to make it unable to perform transmission when said permission flag indicates rejection of transmission.

12. A satellite communication method according to claim 10, wherein said center station transmits its own center station identification information through said communication satellite to the respective portable terrestrial stations to which said extensions are assigned; and wherein said portable terrestrial station includes a step for displaying information for identifying the center station indicated by the center station identification information when said portable terrestrial station receives said center station identification information from said communication satellite.

13. A satellite communication method according to claim 10, wherein said information data for call controlling include a call sound, a busy sound, on-hook/off-hook information and dial information.

14. A satellite communication method comprising a center station and a plurality of portable terrestrial stations so that said center station and said plurality of portable terrestrial stations can perform communication with each other through a communication satellite, said center station including:

a step for receiving a portable terrestrial station transmission signal being transmitted from any of said portable terrestrial stations through said communication satellite and being constituted by a transmission frame containing message data and a portable terrestrial station ID;

a step for transmitting a center station transmission signal for said respective portable terrestrial stations to said communication satellite;

a step for demodulating/decoding a transmission signal constituted by a transmission frame from each of said portable terrestrial stations;

a step for encoding/modulating a signal transmitted from said center station and constituted by a reference frame and frames for said plurality of portable terrestrial stations, and for transmitting the modulated signal as a transmission signal of said center station to said communication satellite through an antenna;

a step for selectively sending control data of the message data and the portable terrestrial station ID of the transmission frame to a controller portion, and for selectively sending data including aural data other than the control data of said message data to a subscriber's line connection control portion, and for selecting a line of an extension corresponding to the portable terrestrial station ID of said transmission frame in response to the portable terrestrial station ID of said transmission frame and correspondence between portable terrestrial station IDs and extensions established by said controller portion;

a step for recognizing a predetermined one of said portable terrestrial stations, that is, a destination portable terrestrial station, in response to the extension set by said controller portion and the portable terrestrial station when transmission message data for portable terrestrial stations from said subscriber's line connection control portion is to be sent to said destination portable terrestrial station, and for forming a portable terrestrial station frame for the destination portable terrestrial station containing a portable terrestrial station ID of the recognized destination portable terrestrial station and said message data, and sending the thus formed frame and the reference frame formed by said controller portion in time-division-multiplex to said transmitter-receiver;

a step for accommodating extensions of a private branch exchange;

a step for controlling said extensions assigned to said respective portable terrestrial stations in accordance with the contents of the reception message data; and a step for detecting the state of every extension, for forming information data to control a call in accordance with the detected state and for sending message data obtained by adding a message ID to said information data to said selection portion through a line corresponding to said extension.

15. A satellite communication method comprising a center station and a plurality of portable terrestrial stations so that said center station and said plurality of portable terrestrial stations can perform communication with each other through a communication satellite, each of said portable terrestrial stations including:

a step for receiving a transmission signal from said center station;

a step for demodulating and decoding the reception signal and for separating said reference frame and said portable terrestrial station frame from each other;

a step for modulating the transmission frame and for encoding the modulated signal to obtain a spectrum diffusion coded signal, and for supplying the coded signal to a transmission antenna;

a step for transmitting said coded signal;

a step for transmitting the contents of said reference frame, and the permission flag and information data for controlling a call of the message data for the portable terrestrial station, a line connection control portion;

a step for generating the transmission frame containing the message data and its own portable terrestrial station ID and for supplying the generated transmission frame to the transmission system portion of said transmitter-receiver;

a step for transmitting message data of the transmission frame in which a message ID is added to control data of the message data to a supply portion, when said transmission frame is to be sent to said center station; and a step for controlling a telephone portion in accordance with the contents of the message data from said first selection portion; and a step for generating information data for controlling a call from said telephone portion and for transmitting the information data to said supply portion.

16. A satellite communication method according to claim 15, wherein said portable terrestrial station includes a step for detecting, in the portable terrestrial station, a level of a frame mark portion in said reference frame, for recognizing the frame for the portable terrestrial station, and wherein said controlling step includes a step for making a display on a display unit in accordance with the contents of the reference frame center station ID from said center station, the control data of said message data and the contents of the permission flag of the frame for the portable terrestrial station and a step for controlling said portable terrestrial station to make it unable to perform transmission when said permission flag indicates rejection of transmission.

17. A satellite communication method according to claim 15, wherein said center station transmits its own center station identification information through said communication satellite to the respective portable terrestrial stations to which said extensions are assigned; and wherein said portable terrestrial station further includes a step for displaying information for identifying the center station indicated by the center station identification information when said portable terrestrial station receives said center station identification information from said communication satellite.

18. A satellite communication method according to claim 15, wherein said information data for call controlling include a call sound, a busy sound, on-hook/off-hook information and dial information.

* * * * *